United States Patent [19]

Babuder et al.

[11] Patent Number: 4,838,583
[45] Date of Patent: * Jun. 13, 1989

[54] FLUID COUPLING

[75] Inventors: Gerald A. Babuder, Mentor; Jeffrey L. Weigl, Northfield Center, both of Ohio

[73] Assignee: Cajon Company, Macedonia, Ohio

[*] Notice: The portion of the term of this patent subsequent to Nov. 12, 2002 has been disclaimed.

[21] Appl. No.: 22,115

[22] Filed: Mar. 5, 1987

Related U.S. Application Data

[63] Continuation-in-part of Ser. No. 788,050, Oct. 16, 1985, Pat. No. 4,650,227, which is a continuation-in-part of Ser. No. 410,408, Aug. 23, 1982, Pat. No. 4,552,389.

[51] Int. Cl.$^4$ ............................................. F16L 19/00
[52] U.S. Cl. ...................................... 285/354; 285/379; 277/189
[58] Field of Search ....................... 285/379, 354, 108; 277/189, 9.5

[56] References Cited

U.S. PATENT DOCUMENTS

| | | | |
|---|---|---|---|
| 949,658 | 2/1910 | Randall . | |
| 1,133,320 | 3/1915 | Rockwood . | |
| 2,292,216 | 8/1942 | Doran | 123/169 |
| 2,462,762 | 2/1949 | Nardin . | |
| 2,619,357 | 11/1952 | Montgomery | 279/60 |
| 2,871,036 | 1/1959 | Goodman | 285/354 |
| 3,080,171 | 3/1963 | Booth | 277/112 |
| 3,139,294 | 6/1964 | Richards, Jr. | 285/379 X |
| 3,262,722 | 7/1966 | Gastineau et al. | 285/379 X |
| 3,275,348 | 9/1966 | Scott | 285/212 |
| 3,298,719 | 1/1967 | Bills et al. | 285/336 |
| 3,521,910 | 7/1970 | Callahan, Jr. et al. | 285/14 |
| 4,508,369 | 4/1985 | Mode | 285/323 X |
| 4,540,205 | 9/1985 | Watanabe et al. | 285/329 |
| 4,552,389 | 11/1985 | Babuder et al. | 285/379 |
| 4,570,981 | 2/1986 | Fournier et al. | 285/332.3 |
| 4,650,227 | 3/1987 | Babuder et al. | 285/379 |

FOREIGN PATENT DOCUMENTS

| | | | |
|---|---|---|---|
| 651733 | 11/1962 | Canada . | |
| 1775199 | 7/1971 | Fed. Rep. of Germany . | |
| 2738244 | 3/1979 | Fed. Rep. of Germany | 285/379 |
| 984093 | 2/1951 | France | 277/189 |
| 1085339 | 7/1954 | France . | |
| 2126301 | 3/1984 | United Kingdom | 285/379 |

Primary Examiner—Thomas F. Callaghan
Attorney, Agent, or Firm—Fay, Sharpe, Beall Fagan, Minnich & McKee

[57] ABSTRACT

Disclosed are arrangements for maintaining an annular sealing gasket in some predetermined position intermediate and substantially coaxial with opposed annular sealing beads extending axially from each of a pair of coupling components. One disclosed arrangement comprises a retainer element having an annular end wall and a cylindrical side wall which define a cavity for closely receiving a flat annular gasket. A plurality of axial retaining legs facilitate retainer mounting to one of the coupling members so that the gasket is captured in the retainer cavity substantially coaxial with the one coupling member and with the associated sealing bead engaging one of the gasket faces. In a second arrangement, a plurality of axial retaining legs are formed integrally with the gasket member. The legs are positioned circumferentially about the gasket for engaging the one coupling component coaxial with the associated sealing bead. In a third arrangement, a separate retaining element is provided to hold the gasket member in coaxial position on the coupling component. The retaining element has an annular endwall and a continuous cylindrical sidewall. A split in the sidewall and the end wall allows the retaining element to flex to grip the coupling component. The arrangements accommodate precise positioning of the gasket relative to the coupling components at initial coupling makeup and do not interfere with the coupling components themselves. The disclosed arrangements also advantageously permit precise repositioning of the gasket relative to the component sealing beads during subsequent disassembly and reassembly of the coupling.

6 Claims, 2 Drawing Sheets

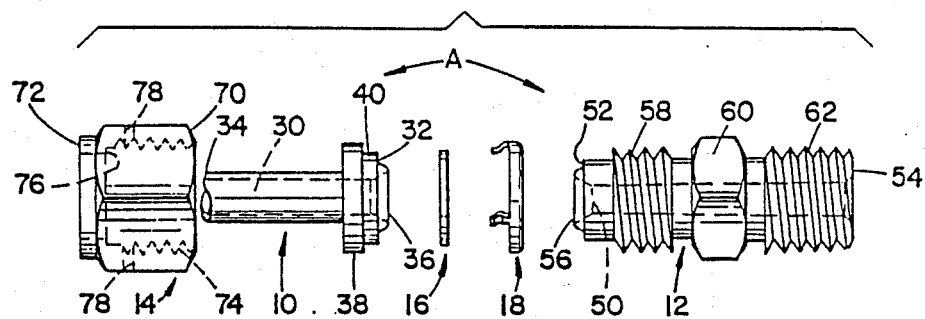
FIG. 1
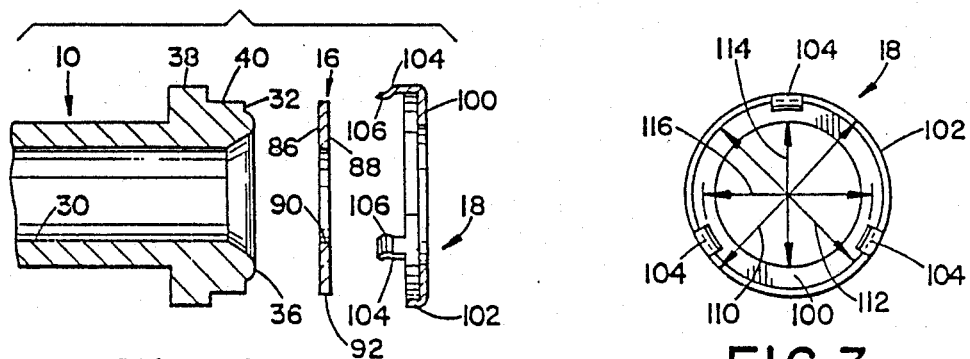
FIG. 2
FIG. 3
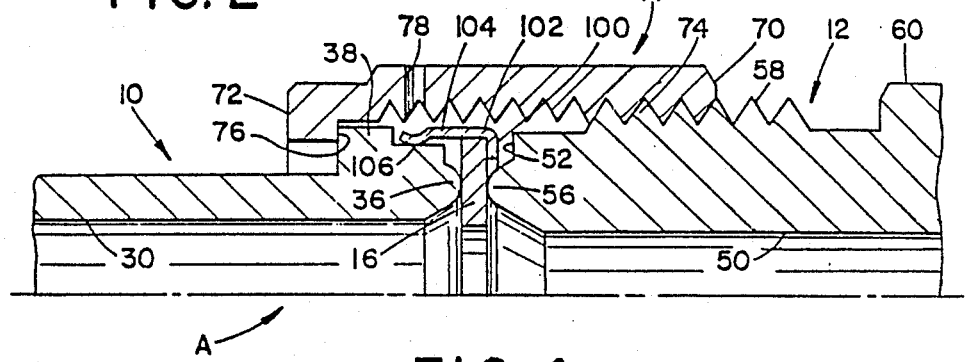
FIG. 4

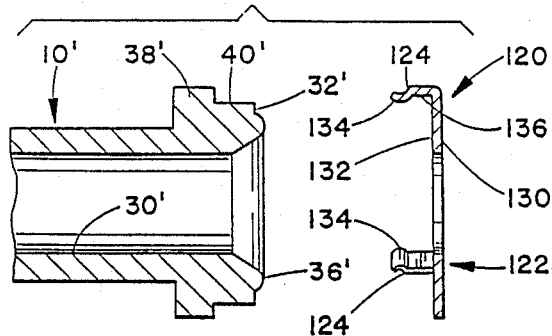
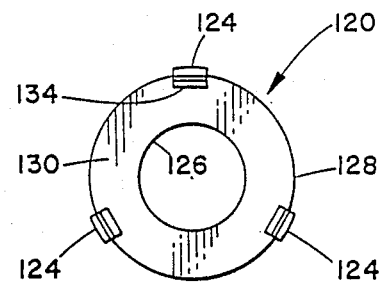
FIG. 5　　　　　　　　　　FIG. 6
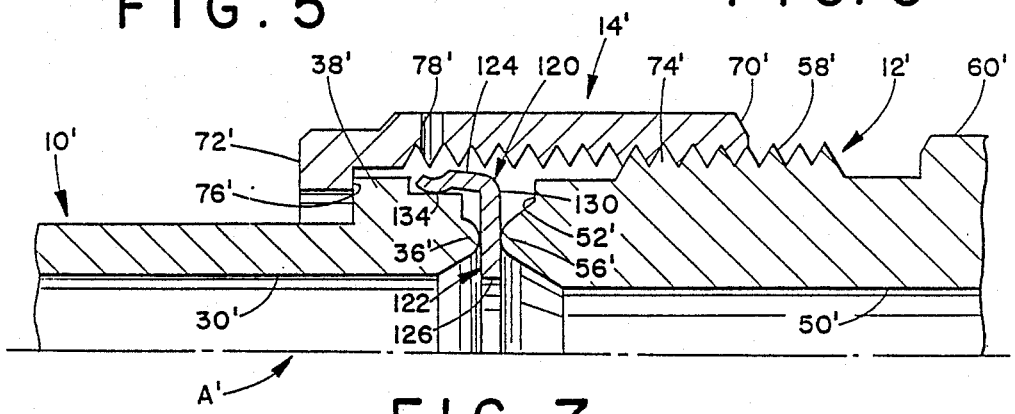
FIG. 7
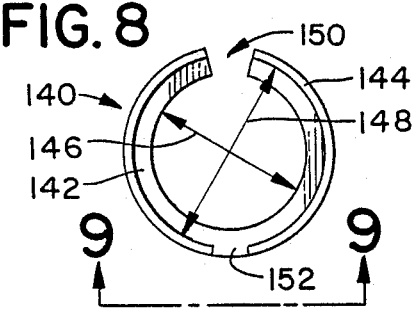
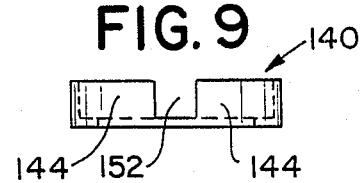
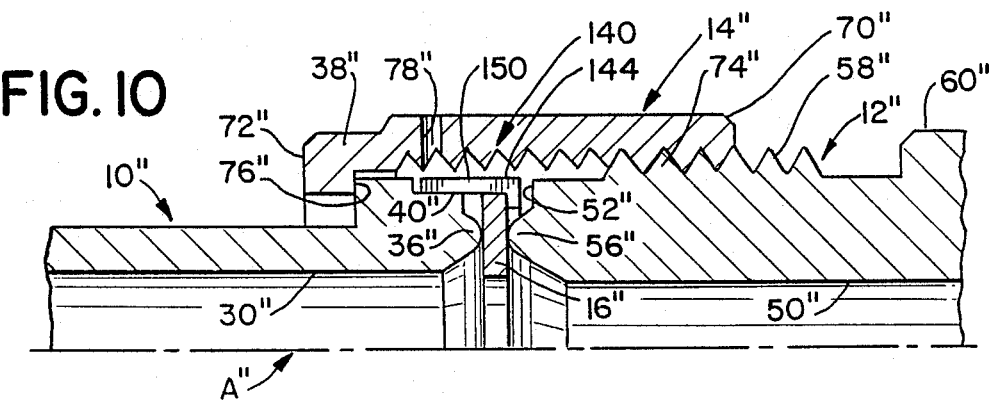

FLUID COUPLING

BACKGROUND OF THE INVENTION

This application is a continuation-in-part of commonly assigned, co-pending application Ser. No. 788,050, filed Oct. 16, 1985, now U.S. Pat. No. 4,650,227, which was a continuation-in-part of commonly assigned application Ser. No. 410,408, filed Aug. 23, 1982, now U.S. Pat. No. 4,552,389, for "Fluid Coupling".

This invention relates to fluid couplings and, more particularly, to a type of coupling suitable for use in both pressure and vacuum applications.

A wide variety of fluid couplings are available for use with both high and low temperatures and in both high pressure and vacuum environments. One such coupling which has found significant commercial acceptance is disclosed in the commonly assigned U.S. Pat. No. 3,521,910 to F. J. Callahan, Jr., et al. In this coupling, a pair of coupling components are provided which have fluid passageways extending longitudinally therethrough. A generally annular rib or sealing bead extends axially outward from the end face of each coupling component in a surrounding relationship with the associated fluid passageway. The components themselves are adapted to be placed in an end-to-end relationship so that the sealing beads are disposed in opposed relation to each other. A generally annular sealing gasket is interposed between the sealing beads, and means are advantageously provided for drawing the components axially toward each other in order that the sealing beads will sealingly engage the opposed faces of the gasket. During assembly or makeup of the coupling, the sealing beads produce slight indentations in the gasket faces.

While the foregoing coupling construction has indeed met with substantial commercial success and has provided improved coupling capabilities over a wide range of system and operating parameters, one difficulty which has been encountered resides in precisely positioning the annular gasket between the annular sealing beads at initial coupling makeup and at subsequent reassembly after disassembly. Because of the basic construction involved, it has been found that the gasket is not always substantially coaxially disposed with the annular sealing beads. This result may, to some extent, adversely affect the overall sealing results. Moreover, and while the sealing beads produce only slight indentations in the gasket at coupling makeup, it is necessary to precisely reposition the gasket when the coupling is disassembled and then reassembled.

Because of problems encountered in achieving the necessary precise repositioning, it has heretofore been the practice to simply insert a new gasket each time the coupling was disassembled and then reassembled. While no particularly great expense is involved by replacing the gaskets, it necessarily requires that maintenance personnel, installers, and the like maintain a ready supply of gaskets in various sizes when working in the field. Such requirement is considered undesirable for many installations and uses of the coupling.

Accordingly, it has been considered desirable to develop an arrangement which would facilitate positive mounting of the gasket relative to the coupling components and sealing beads in order that precise gasket positioning would be assured. Moreover, such an arrangement would advantageously facilitate precise repositioning of the gasket at subsequent disassembly and reassembly of the coupling to eliminate the need for gasket replacement as per the prior accepted practice.

The subject invention contemplates improved arrangements which overcome the foregoing needs and others provide an improved coupling construction which accommodates precise location of a sealing gasket between a pair of opposed annular sealing beads in a fluid coupling construction.

BRIEF DESCRIPTION OF THE INVENTION

The subject invention advantageously provides a gasket retainer arrangement which facilitates retention of an annular sealing gasket on one of a pair of coupling components for precisely locating the gasket intermediate a pair of opposed sealing beads in a substantially coaxial relationship therewith.

More particularly, the subject new arrangement is adapted for use in a fluid coupling of the type having first and second generally cylindrical coupling components which include opposed radial end faces having generally annular sealing beads extending axially therefrom toward each other and with an annular sealing gasket interposed therebetween. The coupling also includes means for moving the components into a closely-spaced coaxial relationship so that the sealing beads sealingly engage the opposed gasket faces. The improvement comprises retainer means for maintaining the gasket in a predetermined located position relative to the end face of one of the coupling components. The retainer means includes a plurality of retaining legs extending axially outwardly of the gasket in a direction generally normal thereto. The legs are disposed in a retaining relationship with the one component at an area thereof spaced rearward from the area of the radial end face.

In one form of the invention, the gasket body itself is disposed intermediate the annular end wall of a separate retainer element and the one component end face. The retainer annular end wall has an inside diameter greater than the outside diameter of the annular sealing bead on the end face of the other of the components. In a second form of the invention, the legs are formed integrally with the gasket body at circumferentially spaced locations located a uniform distance radially outwardly of the axis of the gasket body. In both constructions, the gasket body is disposed in a substantially coaxial relationship with the components as they are moved toward a closely-spaced relationship with each other by the moving means. Also, the retainer means assure that the sealing beads engage substantially the same annular areas of the gasket during subsequent coupling disassembly and reassambly steps. In addition, the retainer means is particularly advantageous when the coupling is installed in a vertical position or in a position where the coupling is hard to reach or see. Note that the retainer holds the gasket in position even when the coupling components are disassembled or mounted vertically. Similarly, the gasket does not have to be manually held in place while the coupling components are being assembled.

According to another aspect of the invention, the retainer legs effectively define a coupling component engaging band dimensioned so that the retainer legs are biased radially outward as the retainer is installed on the one component.

According to another form of the invention, the retainer element has a continuous cylindrical side wall with an interior diameter slightly smaller than the diameter of the coupling component about the end face. The side wall is split at at least one location to permit the wall to deflect outwardly for receipt on, and gripping of, the coupling component.

The principal object of the invention is the provision of an improved arrangement for maintaining a sealing gasket in a predetermined desired position between a pair of opposed annular sealing beads on cooperating coupling components.

Another object of the invention is the provision of such arrangement which facilitates reuse of the gasket upon subsequent disassembly and reassembly of the coupling.

Still another object of the invention is the provision of a gasket retaining arrangement which does not in any way interfere with or impair the sealing achieved between opposed sealing components.

Still other objects and advantages of the present invention will become apparent to those skilled in the art upon a reading and understanding of the following detailed specification.

BRIEF DESCRIPTION OF THE DRAWINGS

The invention may take physical form in certain parts and arrangements of parts, preferred embodiments of which will be described in greater detail of this specification and illustrated in the accompanying drawings which form a part hereof and wherein:

FIG. 1 is an exploded side elevational view of a fluid coupling which incorporates the subject invention thereinto;

FIG. 2 is an enlarged, exploded cross-sectional view of a portion of the structural arrangement shown in FIG. 1;

FIG. 3 is an end view of the gasket retainer used in the FIG. 1 embodiment;

FIG. 4 is a partial, further enlarged cross-sectional view of the coupling of FIG. 1 in the assembled condition.

FIG. 5 is an enlarged, exploded cross-sectional view similar to FIG. 2 but showing a second embodiment of the invention;

FIG. 6 is an end view of the gasket member used in the FIG. 5 embodiment;

FIG. 7 is a partial, enlarged cross-sectional view of the FIG. 5 embodiment showing the coupling in the assembled condition;

FIG. 8 is an end view of a modified form of gasket retainer used in a second embodiment of the invention;

FIG. 9 is a view taken on line 9—9 of FIG. 8; and

FIG. 10 is a partial cross-sectional view similar to FIG. 4 but showing the retainer of FIG. 8 assembled in the coupling.

DETAILED DESCRIPTION OF THE PREFERRED EMBODIMENTS

Referring now to the drawings wherein the showings are for purposes of illustrating preferred embodiments of the invention only and not for purposes of limiting same, FIG. 1 shows a fluid connector or coupling A which incorporates the subject invention. The basic construction of the coupling is known in the art as shown in commonly assigned U.S. Pat. No. 3,521,910 to F. J. Callahan, et al. The specific teachings of this prior patent and the coupling construction disclosed thereby are incorporated herein by reference.

More particularly, and with reference to both FIGS. 1 and 2, connector or coupling A is comprised of a first coupling component 10, a second coupling component 12, a coupling nut 14, a gasket 16, and a gasket retainer 18.

First coupling component 10 includes a suitable fluid passageway 30 extending longitudinally therethrough between a radial inner or end face 32 and an outer or terminal end 34. While terminal end 34 may include any convenient means for affixing coupling component 10 to a fluid line, a male or female tube receiving area (not shown) is contemplated in the embodiment here described. However, any other conventional arrangement such as threaded connecting means, ferrule-type tube couplings, and other arrangements may also be suitably employed.

An annular, radiused sealing bead or rib 36 extends axially outward from radial end face 32 in a coaxial relationship with passageway 30 to effect a sealing relationship with gasket 16 in a manner to be described. A circumferential locating or mounting flange 38 is spaced axially along first coupling component 10 some predetermined distance from end face 32. An area 40 having a diameter greater than the outside diameter of sealing bead 36 is disposed axially between end face 32 and the flange. The reasons and purposes for this configuration will become apparent hereinafter.

Second coupling component 12 includes a fluid passageway 50 extending longitudinally thereof between a radial inner or end face 52 and an outer or terminal end 54. An annular, radiused sealing bead 56, which is substantially identical to bead 36, extends axially outward of radial end face 52 in a coaxial relationship with the passageway 50. As shown in FIG. 1, second coupling component 12 includes a threaded area 58 rearwardly adjacent end face 52 for threaded cooperation with nut 14, an intermediate, slightly enlarged hexagonal tool receiving area 60, and a threaded area 62 adjacent outer or terminal end 54. In the embodiment shown, theaded area 62 comprises pipe threads for conveniently securing the connector to associated or adjacent structure.

It will be readily appreciated, however, that other configurations for second coupling component 12 may also be advantageously employed. Moreover, alternative arrangements may be suitably employed in place of threaded area 58 for purposes of drawing sealing beads 36, 56 toward each other into sealing engagement with gasket 16 and in place of threaded area 62 for mounting the coupling to associated structure or to a fluid line. One alternative comprises a pair of opposed glands wherein each gland is configured similarly to the one shown as first coupling component 10 in the FIGURES. In this case, a separate male nut is associated with one gland and a separate female nut is associated with the other gland. These nuts, in turn, threadably mate with each other to draw the glands into sealing engagement with the gasket. Still other alternative arrangements include tees, crosses, elbows, unions, and the like.

Coupling nut 14 comprises an open-ended structure having a forward end 70 and a rear end 72 with the interior of the nut being threaded as at 74 from the forward toward the rear end. Threads 74 are adapted to mate with threads 58 on second coupling component 12 for drawing components 10, 12 toward each other in a manner to be described. A radially inward extending shoulder 76 is disposed at nut rear end 72 and has a smaller inside diameter than the outside diameter of circumferential flange 38 on coupling component 10. Thus, shoulder 76 may act against flange 38 as an engaging and retaining means for the first coupling component as will be described. A pair of generally opposed lead test ports 78 radially penetrate the side wall of the nut for reasons well known in the art.

With particular reference to FIG. 2, gasket 16 comprises an annular member having generally opposed face areas 86,88. Inside diameter 90 is approximately the same diameter as component passages 30,50 (FIG. 1) and outside diameter 92 is preferably slightly larger than the diameter of portion 40 on the first component 10.

In accordance with the subject invention, and with particular reference to FIGS. 2 and 3, retainer device 18 is advantageously provided for mounting gasket 16 on first component 10 in a precise location intermediate sealing beads 36,56 when the coupling is assembled. As shown, retainer 18 is comprised of an annular end wall 100 having a generally cylindrical side wall 102 extending generally normal thereto for defining a gasket receiving cavity.

Extending outwardly from the outer or free edge of side wall 102 are a plurality of substantially identical retaining legs 104. As shown in FIGS. 2 and 3, the preferred embodiment of the invention contemplates use of three equidistantly spaced-apart legs, although a different number or different relative spacing could also be satisfactorily employed. Each of retaining legs 104 is formed to include an engaging means or area 106 adjacent the outer terminal end thereof. As shown, these engaging means are somewhat U-shaped and conformed so that the base area of each is disposed radially inward of the associated leg 104. Each of areas 106 has an arcuate conformation thereacross between the opposite side edges of the associated leg 104 so that at least some line contact is made circumferentially of area 40 when the reatiner is installed. It will be appreciated that other forms of engaging means may also be satisfactorily employed. For example, generally V-shaped, arcuate shaped, or still other conformations may be used in place of the generally U-shape as necessary and/or desired. Such modifications do not in any way depart from the overall intent or scope of the present invention.

Retainer 18 may conveniently comprise a stamping or the like formed of a suitable metal. Typically, however, the retainer will be stamped from stainless steel because this metal is particularly suited for use in a wide variety of fluid system environments.

The retainer is constructed to include particular dimensional characteristics. In this regard, and with continued reference to FIGS. 2 and 3, the depth of the gasket receiving cavity defined by end wall 100 and side wall 102 is such that, at most, it is only slightly greater than the thickness of gasket 16. This assures that the gasket will be fully received in the cavity for obtaining accurate and consistent locating results relative to component 10 without physically interfering with the component. The outside diameter 110 of side wall 102 is, at most, only slightly greater than the diameter of first component flange 38. The inside diameter 112 of the side wall is such that the gasket 16 will be fairly closely received in the cavity and thus prevented from radial movement relative to end face 32. Inside diameter 114 of retainer end wall 100 is at least slightly greater than the outside diameter of sealing bead 56 so that there is no interference between the retainer end wall and sealing bead. Also, the thickness of end wall 100 is less than the axial extension of sealing bead 56 from its associated radial end face 52.

U-shaped engaging means 106 define, in combination with each other, an engaging band or zone. The diameter 116 of this zone is slightly less than the diameter of first component portion 40. Still further, the length of legs 104 is such that when gasket 16 is received in the receiving cavity of retainer 18 and the retainer is thereafter installed on component 10, the outermost or terminal ends of the legs will be disposed in a non-contacting relationship with flange 38.

FIG. 4 shows the coupling of FIG. 1 in an assembled condition with the retainer and gasket cooperatively installed therein. At the time of assembly, the retainer and associated gasket may be installed onto component 10 by radially positioning the assembly generally coaxial with the component and the axially inserting the retainer thereonto with engaging means 106 frictionally engaging area 40. Because diameter 116 (FIG. 3) is less than the diameter of area 40, legs 104 will be urged radially outward so that a biasing type of retaining force will continuously be exerted on surface 40. Because of the close dimensional relationships between the gasket and retainer, the gasket is thus substnatially coaxially mounted on component 10 in a captured relationship between retainer end wall 100 and sealing bead 36.

In addition to securing retainer 18 to component 10, the U-shaped or arcuate conformation of engaging means 106 is desirable for other reasons. First, the radially outward extending nature of the engaging means adjacent the ends of the legs renders it somewhat easier to install the retainer onto coupling component 10. Second, the arcuate conformation reduces the likelihood of inadvertently contacting sealing bead 36 during retainer installation. Such contact may scratch or mar the sealing bead and adversely affect the sealing relationship with gasket 16.

Coupling nut 14 may then be advanced onto component 12 by means of threaded engagement between threaded areas 74,58. Advancement of the nut onto component 12 thus effectively draws components 10, 12 coaxially toward each there until sealing beads 36,56 sealingly engage the opposed faces of gasket 16. Retainer 18 advantageously maintains a coaxial location for the gasket with the sealing beads during this fitting makeup process.

In the particular fitting construction here under discussion, coupling components 10,12 and coupling nut 14 are typically manufactured from stainless steel. Sealing gasket 16, in turn, is constructed from nickel or the like. In addition, other materials may also be suitably employed for the coupling components and gasket to achieve desired results in a wide variety of different environments. At the time of fitting makeup in the manner shown by FIG. 4, sealing beads 36,56 will produce slight annular indentations in the opposite faces of the gasket.

Even with such slight indentations, and upon disassembly of the fitting for maintenance or like purposes, it is necessary to coaxially realign the gasket with sealing beads 35,56 when the coupling is reassembled. If substantial realignment is not obtained, undesired fitting leakage could occur. Heretofore, a new gasket was inserted into the coupling each time the coupling was disassembled and then reassembled. The necessity for this action has been considered undesirable, particularly when working in the field.

However, by using retainer 18 in the manner described above, gasket 16 is always maintained in the preselected position substantially coaxial with sealing beads 36,56. Even when the coupling is disassembled and later reassembled, the retainer assures that the gasket is automatically coaxially realigned with the annular sealing beads to thereby prevent the potential for coupling leaks due to gasket misalignment. As a result, the necessity or desirability for installing a new gasket is successfully overcome.

The particular spacial relationships described above with reference to FIG. 3 assure that the retainer will in no way interfere with the cooperative sealing relationships between the coupling components themselves. For example, the external diameter of the retainer is such that it will not interfere with the inside wall of coupling nut 14. The inside diameter of retainer annular end wall 100 and the thickness of end wall 100 are such that they will not interfere with sealing bead 56 and radial end face 52 at coupling makeup. The inside diameter of retainer side wall 102 fairly closely embraces the outside periphery of the gasket and legs 104 have an axial extent which will not interfere with flange 38. Finally, U-shaped engaging means 106 engage area 40 with line contact over short accurate spans and cumulatively define an engaging band or zone which assures good frictional engagement with area 40.

FIGS. 5-7 illustrate a second embodiment of the invention wherein the retaining means are formed as an integral part of the gasket. In the FIGS. 5-7 embodiment, parts or components which are the same as those previously described with reference to the FIGS. 1-4 embodiment are identified by like reference numerals but differentiated by the addition of a primed (') suffix. The description of such an element as set forth with respect to the FIGS. 1-4 embodiment is to be taken as equally applicable to the FIGS. 5-7 embodiment unless otherwise noted.

The FIGS. 5-7 embodiment uses a gasket and retaining means assembly 120 which includes a gasket body 122 having retaining means in the form of legs 124 integrally formed therewith. Gasket body 122 has a generally annular configuration with an inner opening 126 and an outer peripheral, circular edge 128 (FIG. 6). The opposite surfaces 130, 132 of body 122 define seal faces for engagement with sealing beads 36', 56', respectively.

Legs 124 are formed integrally with body 122 about the outer periphery thereof. In the preferred arrangement, three such legs are spaced circumferentially about the body at 120° apart; however, as is apparent, the number and spacing of the legs could vary. As discussed with reference to the FIGS. 1-4 embodiment, each of the retaining legs is formed to include engaging means or areas 134 closely adjacent the outer terminal end. The engaging means are somewhat U-shaped with the base of the U facing radially inwardly as shown. Preferably, as best seen in FIG. 6, the areas 134 are arcuately formed so that when installed, they achieve line contact with surface 40'.

The legs are, as mentioned, formed integrally with gasket body 120 and extend generally perpendicular to the seal surfaces 130,132. In addition, the radial distance to surface areas 134 from the axis of opening 126 is preferably slightly less than the radius of surface 40'. The radius from the axis of opening 126 to the inner surface 136 of legs 124 is preferably slightly greater than the radius of surface 40'. Thus, when the assembly 120 is in the installed position shown in FIG. 7, the legs 124 are deflected radially outward a slight amount generating a radially inward directed gripping force between areas 134 and surface 40'.

It is important to note that the total length of legs 124 from surface 132 is less than the axial distance from the outermost end or apex of bead 36' to flange 38'. Thus, when the coupling is fully made-up, and full engagement is achieved between the beads 36', 56' and gasket seal surfaces 132, 130, respectively, the ends of the legs 124 do not engage flange 38'.

The gasket and retaining means assembly 120 may comprise a stamping or the like formed of a suitable metal. Additionally, it should be understood that the gasket faces can be given additional treatment such as plating to improve the sealing characteristics under certain conditions.

In using the gasket and retaining means assembly of the FIGS. 5-7 embodiment, results substantially equal to those obtaned with the FIGS. 1-4 embodiment are achieved. Specifically, when disassembled and reassembled the retaining legs assure that the gasket body is coaxially realigned with the sealing beads to thereby prevent potential leaks due to misalignment.

FIGS. 8-10 illustrate a third embodiment of the invention which uses a modified form of retaining means which is separate from the gasket. In the FIGS. 8-10 embodiment, parts or components which are the same as those previously described with reference to the FIGS. 1-4 embodiment are identified by like reference numerals but differentiated by the addition of a double prime (") suffix. The description of such an element as set forth with respect to the FIGS. 1-4 embodiment is to be taken as equally applicable to the FIGS. 8-10 embodiment unless otherwise noted.

In the FIGS. 8-10 embodiment a separate retaining element 140 functions to hold gaset 16" in position on sealing bead 36". Element 140 can best be understood by reference to FIGS. 8 and 9. In particular, element 140 includes a generally annular end wall 142 which is integral with a cylindrical side wall 144. Inside diameter 146 of end wall 142 is, of course, slightly larger than the outside diameter of sealing bead 56" to avoid interference between the end wall 142 and the bead 56".

With respect to side wall 144 it should be understood that its normal inside diameter 148 in an unassembled condition is preferably slightly smaller than the outside diameter of engaging area 40". In addition, in this embodiment the outside diameter of the gasket 16" is also very slightly smaller than the diameter of engaging area 40".

As best seen in FIG. 10, the length of side wall 144 is less tha the assembled distance from the outer face of gasket 16" to the flange 38". However, the length must be great enough to provide significant contact and engagement with area 40".

In order to allow retainer 140 to engage and hold gasket 16" and to be received on engaging area 40" it is provided a small segment 150 is cut-out as best shown in FIG. 8. This allows the retainer to be resiliently expanded to receive the gaset 16", and to be placed in assembled position on engaging area 40". The dimensional relationships are such, however, as to assure that the retainer positively grips area 40" to hold the components in assembled relationship.

The ability of retainer 140 to undergo resilient radial expansion can be increased, if desired or necessary, by cutting away a portion 152 of side wall 144 in an area diametrically located relative to the cut-out segment 150.

It should be appreciated that the side wall 144 could be provided with deformed contact areas similar to areas 134 of legs 124 of the FIGS. 5–7 embodiment. Further, the arrangement of the cut-out portions 150 and 152 could be modified from that shown.

The invention has been described with reference to preferred embodiments. Obviously, modifications and alterations will occur to others upon the reading and understanding of this specification. It is intended to include all such modifications and alterations insofar as they come within the scope of the appended claims or the equivalents thereof.

Having thus described the invention, it is now claimed:

1. In a fluid coupling of the type having first and second generally cylindrical coupling components including fluid passageways extending longitudinally thereof, said components having opposed radial end faces including generally annular sealing beads extending axially therefrom toward each other for engagement with a sealing gasket interposed therebetween, said coupling further including means for moving said components into a close-spaced substantially coaxial relationship such that said sealing beads will sealingly engage opposite face areas of the gasket, the improvement comprising:

a generally annular gasket body having oppositely disposed seal faces and retainer means for maintaining said gasket in a predetermined located position relative to the end face of one of said components in a substantially coaxial relationship therewith, said retainer means including an annular end wall having an outer diameter slightly larger than said gasket body and a central opening with a periphery lying outside the maximum diameter of said beads but inwardly of the outer diameter of said gasket body, said retainer further including a generally cylindrical side wall integral with said end wall and encircling said gasket body and extending outwardly thereof in a direction generally normal to said seal faces in a retaining relationship with said one component at an area thereof spaced axially rearward from the associated radial end face such that said gasket is held generally with its said seal faces parallel to the sealing bead at said one component end face said gasket body having an inside diameter less than the inside diameter of the annular sealing bead on the end face of the other of said components, whereby said gasket is positively located and held in a generally coaxial relationship with said components when they are moved toward said closely-spaced relationship by said moving means, said sealing beads each engaging substantially the same portion of the associated gasket face area during subsequent disassembly and reassembly of the coupling; and, wherein said moving means comprises an open-ended first coupling member threaded from one end thereof toward the other for threaded engagement with said other component and wherein said first coupling member other end includes a radially inward extending shoulder which drivingly engages a radially outward flange on said one component axially spaced from the radial end face thereof, said one component including an area between said flange and said radial end face for receiving said generally cylindrical side wall axially thereonto for securing on said one component with said gasket body disposed in a desired position, said area between said flange and said radial end face having a diameter greater than the maximum radial extent of said sealing beads.

2. The improvement as defined in claim 1 wherein said gasket body has an outer diameter which is at least slightly less than the outer diameter of said end face of said one component.

3. The improvement as defined in claim 1 wherein said generally cylindrical side wall includes means for permitting said side wall to resiliently deflect for frictionally engaging said one component in said area between said flange and said radial end face.

4. The improvement as defined in claim 1 wherein said side wall is discontinuous about said end wall.

5. The improvement as defined in claim 4 wherein said end wall and said side wall have a segment cut therefrom to permit said retainer means to resiliently deflect in a radial direction.

6. In a fluid coupling of the type having first and second generally cylindrical coupling components including fluid passageways extending longitudinally thereof, said components having opposed radial end faces including generally annular sealing beads extending axially therefrom toward each other for engagement with a sealing gasket interposed therebetween, said coupling further including means for moving said components into a close-spaced substantially coaxial relationship such that said sealing beads will sealingly engage opposite face areas of the gasket, the improvement comprising:

a generally annular gasket body having oppositely disposed seal faces and retainer means for maintaining said gasket in a predetermined located position relative to the end face of one of said components in a substantially coaxial relationship therewith, said retainer means including an annular end wall having an outer diameter slightly larger than said gasket body and a central opening with a periphery lying outside the maximum diameter of said beads but inwardly of the outer diameter of said gasket body, said retainer further including a side wall integral with said end wall and encircling said gasket body and extending outwardly thereof in a direction generally normal to said seal faces in a retaining relationship with said one component at an area thereof spaced axially rearward from the associated radial end face such that said gasket is held generally with its said seal faces parallel to the sealing bead at said one component end face, said gasket body having an inside diameter less than the inside diameter of the annular sealing bead on the end face of the other of said components, whereby said gasket is positively located and held in a generally coaxial relationship with said components when they are moved toward said closely-spaced relationship by said moving means, said sealing beads each engaging substantially the same portion of the associated gasket face area during subsequent disassembly and reassembly of the coupling; and, wherein said moving means comprises an open-ended first coupling member threaded from one end thereof toward the other for threaded engagement with said other component and wherein said first coupling member other end includes a radially inward extending shoulder which drivingly engages a radially outward flange on said one component axially spaced from the radial end face thereof, said one component including an area between said flange and said radial end face for receiving said side wall axially thereonto for securing on said one component with said gasket body disposed in a desired position, said area between said flange and said radial end face having a diameter greater than the maximum radial extent of said sealing beads.

* * * * *